(12) United States Patent
Kang

(10) Patent No.: US 9,910,516 B2
(45) Date of Patent: Mar. 6, 2018

(54) SIGNAL PROCESSING DEVICE AND CONTROL METHOD

(71) Applicant: LG ELECTRONICS INC., Seoul (KR)

(72) Inventor: Donghyun Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 14/909,324

(22) PCT Filed: Aug. 20, 2014

(86) PCT No.: PCT/KR2014/007725
§ 371 (c)(1),
(2) Date: Feb. 1, 2016

(87) PCT Pub. No.: WO2015/026152
PCT Pub. Date: Feb. 26, 2015

(65) Prior Publication Data
US 2016/0188000 A1 Jun. 30, 2016

Related U.S. Application Data

(60) Provisional application No. 61/867,620, filed on Aug. 20, 2013.

(51) Int. Cl.
*G06F 3/038* (2013.01)
*G06F 13/14* (2006.01)
*G06F 3/0354* (2013.01)

(52) U.S. Cl.
CPC .......... *G06F 3/038* (2013.01); *G06F 3/03543* (2013.01); *G06F 3/03547* (2013.01); *G06F 3/03549* (2013.01); *G06F 13/14* (2013.01)

(58) Field of Classification Search
None
See application file for complete search history.

(56) References Cited

U.S. PATENT DOCUMENTS

| 5,757,354 | A | 5/1998 | Kawamura |
| 6,131,134 | A | 10/2000 | Huang et al. |
| 2003/0056051 | A1 | 3/2003 | Burke et al. |
| 2003/0076357 | A1 | 4/2003 | Glaser |

(Continued)

FOREIGN PATENT DOCUMENTS

| CN | 1352767 A | 6/2002 |
| CN | 101836176 A | 9/2010 |

(Continued)

OTHER PUBLICATIONS

English machine translation of Korean patent publication KR10-2006-0083716.*

*Primary Examiner* — Nicholas Lee
(74) *Attorney, Agent, or Firm* — Birch, Stewart, Kolasch & Birch, LLP

(57) ABSTRACT

A signal processing device and a control method are disclosed. The signal processing device comprises: an input unit which receives a signal from an external input device or senses a connection state; a storage unit for storing information on the external input device; and a control unit for recognizing and activating the external input device on the basis of the signal inputted from the external input device and the stored information.

14 Claims, 17 Drawing Sheets

(56) References Cited

U.S. PATENT DOCUMENTS

| | | |
|---|---|---|
| 2006/0025206 A1 | 2/2006 | Walker et al. |
| 2010/0082846 A1 | 4/2010 | Kim et al. |
| 2013/0088452 A1 | 4/2013 | Glaser-Seidnitzer et al. |
| 2013/0151826 A1 | 6/2013 | Tu |

FOREIGN PATENT DOCUMENTS

| | | |
|---|---|---|
| JP | 11-219155 A | 8/1999 |
| JP | 2000-148362 A | 5/2000 |
| JP | 2000-194479 A | 7/2000 |
| JP | 2003-5908 A | 1/2003 |
| JP | 2011-86293 A | 4/2011 |
| JP | 2012-99941 A | 5/2012 |
| KR | 10-2006-0083716 A | 7/2006 |
| TW | 444165 B | 7/2001 |
| WO | WO 2012/157082 A1 | 11/2012 |

* cited by examiner

FIG. 3

| Property | Type | Value |
|---|---|---|
| type | DOMString | HbbtvInputDeviceChanged |
| target | EventTarget | root element of the DOM tree |
| bubbles | boolean | FALSE |
| cancelable | boolean | FALSE |
| isTrusted | boolean | TRUE |

FIG. 4

| Aspect | Description |
|---|---|
| Pointer | Allows to move a pointing indicator across the screen, and allows to perform trigger-type actions associated with screen locations. Example: computer mouse with one or more buttons. |
| Keyboard | Allows entering text, and other character sequences. Example: 101-key computer keyboard. |
| VoiceRecognition | Allows entering spoken commands and/or text. |
| TVRemote | Allows triggering functions that are typically used to control a TV set. Example: digit keys for selecting services, or colour buttons. |

FIG. 5

| Property | Type | Description |
|---|---|---|
| Pointer:Type | String | Overall type of the device (e.g. mouse, trackball, wand, or touchpad) |
| Pointer:SelectButtons | String[] | A microswitch which can be pressed ("clicked") to select or interact with an element of a graphical user interface. |
| Pointer:FunctionButtons | String[] | A microswitch which can be pressed ("clicked") to effect special functions of the device. |
| Pointer:Wheel | String[] | A small disc or ring (the "wheel") that is used for scrolling or panning of content that is larger than the screen. |
| Pointer:Gestures | String[] | Combinations of pointing device movements and clicks, which the software recognizes as specific commands. |

FIG. 6

| Pointer:Type | Description |
|---|---|
| mouse | A pointing device that functions by detecting two-dimensional motion relative to its supporting surface. |
| trackball | A device where the user rolls the ball with the thumb, fingers, or the palm of the hand to move a pointer. |
| wand | A pointing device that functions by detecting three-dimensional motion relative to the gravity force field. |
| touchpad | A pointing device featuring a tactile sensor, a specialized surface that can translate the motion and position of a user's fingers to a relative position on screen. |

FIG. 7

| Pointer:SelectButtons constant name | Value | Description |
|---|---|---|
| left | 0x01 | The leftmost selection button. |
| middle-left | 0x02 | The second leftmost selection button. |
| middle | 0x04 | The middle selection button. |
| middle-right | 0x08 | The second rightmost selection button. |
| right | 0x10 | The rightmost selection button. |

FIG. 8

| Pointer:SelectButtons combination constant name | Value | Description |
|---|---|---|
| left | 0x01 | 1 selection button |
| left/right | 0x03 | 2 selection buttons |
| left/middle/right | 0x07 | 3 selection buttons |
| left/middle-left/middle-right/right | 0x0F | 4 selection buttons |
| left/middle-left/middle/middle-right/right | 0x1F | 5 selection buttons |

FIG. 9

| Pointer:SelectButtons | Description |
|---|---|
| left | The leftmost selection button. |
| middle-left | The second leftmost selection button. |
| middle | The middle selection button. |
| middle-right | The second rightmost selection button. |
| right | The rightmost selection button. |

FIG. 10

| Pointer:SelectButtons combination | Description |
|---|---|
| left | 1 selection button |
| left/right | 2 selection buttons |
| left/middle/right | 3 selection buttons |
| left/middle-left/middle-right/right | 4 selection buttons |
| left/middle-left/middle/middle-right/right | 5 selection buttons |

FIG. 11

| Pointer:FunctionButtons | Description |
|---|---|
| Power | A power button to change the TV's state between the various power states (e.g. on, standby, etc.). |
| Home | A button to go directly to the starting point of the TV's graphical use interface. |
| Back | A button to go back to the previously displayed part of the graphical user interface. |
| Navigation | Up, down, left, and right arrow keys for navigating the graphical user interface. |
| Volume | Up, and down buttons to control the audio volume. |
| Channel | Up, and down buttons to switch to the next and previous channels respectively. |
| Mute | A button to toggle between the muted and unmuted audio states. |

FIG. 12

| Pointer:Wheel | Description |
|---|---|
| vertical | A vertical wheel for scrolling up and down. |
| horizontal | A horizontal wheel for scrolling left and right. |
| omnidirectional | A scroll facility for simultaneous scrolling in all directions. |

FIG. 13

| Property | Type | Description |
|---|---|---|
| Keyboard:Type | String | The construction type of the keyboard. |
| Keyboard:KeyGroups | String[] | Groups of keys present on the keyboard. |
| Keyboard:Modifiers | String[] | Available modifier keys. |
| Keyboard:Language | String | Language and layout of the key legends. |
| Keyboard:DoesRepeat | Boolean | Repeating keys when held down? |

FIG. 14

| Keyboard:Type | Description |
|---|---|
| Desktop | Desktop PC type keyboard allowing for high typing speeds at low strain. |
| RubberDome | Dome-switch, or other chiclet type keyboard allowing for reduced typing speeds at high strain. |
| Software | Virtual keyboard displayed on the screen through software. Typically operated using a pointing device, or a TV remote with navigation keys. |

FIG. 15

| Keyboard:KeyGroups | Description |
|---|---|
| Typewriter | Letters, digits, space, punctuation, etc. |
| Function | F1, F2, etc. |
| Numeric | Separate numeric keypad |
| Navigation | Up, down, left, right arrows, page up, page down, home, end, etc. |
| Other | ESC, print screen, etc. |

FIG. 16

| Keyboard:Modifiers | Description |
|---|---|
| Shift | Used to type the upper of two symbols engraved on a given key, or the upper-case variant in case of letter keys. |
| ShiftLock | Pressing this key sets an input mode in which all typed keys generate the upper of two symbols engraved on a given key, or the upper-case variant in case of letter keys by default. The keyboard remains in shift lock mode until the key is pressed again. |
| CapsLock | Pressing this key sets an input mode in which all typed letters are uppercase by default. Non-letter keys remain unaffected. The keyboard remains in caps lock mode until the key is pressed again. |
| Ctrl | Used to trigger special operations when used in concert with other keys. |
| Alt | Used to trigger special operations when used in concert with other keys. |
| AltGr | Used to trigger special operations when used in concert with other keys. |
| Option | Used to trigger special operations when used in concert with other keys. |
| Cmd | Used to trigger special operations when used in concert with other keys. |

FIG. 17

| Property | Type | Description |
| --- | --- | --- |
| VoiceRecognition:CanDoSpeechToText | Boolean | Whether speech-to-text is available. |
| VoiceRecognition:SpokenCommands | String[] | List of spoken commands that are understood. |

FIG. 18

| Property | Type | Description |
| --- | --- | --- |
| TVRemote:Type | String | Overall type of the device (e.g. infrared, Bluetooth, or WiFi) |
| TVRemote:ButtonGroups | String[] | The functional groups of buttons present on the remote. |

FIG. 19

| TVRemote:ButtonGroups | Description |
|---|---|
| Infrared | Uni-directional transmission in the range of 100 μm to 100 nm wavelength (IR to UV). Requires line of sight. |
| Bluetooth | Bi-directional, personal area network (PAN) type connection in the 2400MHz to 2480 MHz ISM band. |
| WiFi | Bi-directional, local area network (LAN) type connection using the IEEE 802.11 suite of specifications. |

FIG. 20

| TVRemote:ButtonGroups | Description |
|---|---|
| Power | Power on/off, standby, etc. |
| Digits | The decimal digits zero through nine, etc. |
| Zapper | Channel up/down, volume up/down, mute, etc. |
| Function | The four colour buttons, and other generic buttons. |
| Navigation | The four arrow keys, OK, home, back, etc. |
| Teletext | Teletext, transparent, freeze, reveal info, next/previous subpage, size, etc. |
| Playback | Play, pause, stop, fast forward, fast rewind, next, track, previous track, record, etc. |
| SilverDisc | Eject, open/close, timer mode, etc. |

FIG. 22

```
Service descriptionService
    = ServiceFactory.newService(org.hbbtv.InputDeviceService,
        "urn:hbbtv-org:Input-Device-Vocabulary:2013",
        null);

PropertyRef pointerRef;
PropertyRef pointerTypeRef;
PropertyRef pointerSelnBtnsRef;

try {
    pointerRef        = descriptionService.newProperty("Pointer");
    pointerTypeRef    = descriptionService.newProperty("Pointer:Type");
    pointerSelnBtnsRef = descriptionService.newProperty("Pointer:SelectButtons");
} catch (NameException ex) {
    throw new RuntimeException(ex);
}

PropertyRef[] propertyRefs = new PropertyRef[] { pointerRef,
                                                  pointerTypeRef,
                                                  pointerSelnBtnsRef };
Evidence      localDevice  = newHTTPEvidence();

try {
    PropertyValues propertyValues = descriptionService.getPropertyValues(localDevice,
                                                                          propertyRefs);
    PropertyValue pointer     = propertyValues.getValue(pointerRef);
    PropertyValue type        = propertyValues.getValue(pointerTypeRef);
    PropertyValue selnButtons = propertyValues.getValue(pointerSelnBtnsRef);

if (pointer.exists() && type.exists()) {
        console.log(type.getString() + " type pointing device found");
        if (selnButtons.exists()) {
            console.log("pointing device has " + selnButtons.length + " buttons");
        }
    }
    else {
        console.log("no pointing device found");
    }
} catch (Exception ex) {
    throw new RuntimeException(ex);
}
```

FIG. 23

```
...
element.addEventListener('HbbtvInputDeviceChanged', inputDeviceChangedHdlr, false);
...
}
function inputDeviceChangedHdlr(evt) {
    if (!evt) var evt = window.event;
    // evt provides access to the event
    switch (evt.reason) {
    case: HbbtvInputDeviceChange.added:
        PropertyValues propertyValues = descriptionService.getAll();
        PropertyRef    pointerRef = descriptionService.newProperty("Pointer");
        int            newNumPointers = getNumPropertiesWithRef(propertyValues, pointerRef);
        if (newNumPointers != numPointers) {
            console.log((newNumPointers - numPointers)
                + " new pointing devices have become available");

numPointers = newNumPointers;
        }
        break;
    case HbbtvInputDeviceChange.removed:
        ...
        break
    case HbbtvInputDeviceChange.updated:
        ...
        break
    default
        ...
        break
    }
}
```

FIG. 24

| Namesapce | urn:hbbtv-org:Input-Device-Vocabulary:2013 | | | |
|---|---|---|---|---|
| Aspect | Property | Type | Mandatory | Values |
| Pointer | :Type | String | + | mouse, trackball, wand, touchpad |
| | :SelectButtons | String[] | | left, right, etc, or custom |
| | :FunctionButtons | String[] | | Power, Home, Back, Navigation, Volume, Channel, Mute |
| | :Wheel | String[] | | vertical, horizontal, omnidirectional |
| | :Gestures | String[] | | command names |
| Keyboard | :Type | String | | Desktop, RubberDome, Software |
| | :KeyGroups | String[] | + | Typewriter, Function, Numeric, Navigation, Other |
| | :Modifiers | String[] | | Shift, ShiftLock, CapsLock, Ctrl, Alt, AltGr, Option, Cmd |
| | :Language | String | + | IETF language tag |
| | :DoesRepeat | Boolean | | true, false |
| VoiceRecognition | :CanDoSpeechToText | Boolean | + | true, false |
| | :SpokenCommands | String[] | | list of commands |
| TVRemote | :Type | String | | Infrared, Bluetooth, WiFi |
| | :ButtonGroups | String[] | + | Power, Digits, Zapper, Function, Navigation, Teletext, Playback, SilverDisc |

SIGNAL PROCESSING DEVICE AND CONTROL METHOD

CROSS REFERENCE TO RELATED APPLICATIONS

This application is the National Phase of PCT International Application No. PCT/KR2014/007725 filed on Aug. 20, 2014, which claims priority under 35 U.S.C. 119(e) to U.S. Provisional Application No. 61/867,620, filed on Aug. 20, 2013, all of which are hereby expressly incorporated by reference into the present application.

TECHNICAL FIELD

The present invention relates to a signal processing device and a control method thereof.

BACKGROUND ART

With development of broadcast and communication technology, research into various broadcast apparatuses and broadcast services has been conducted. For example, research into broadcast apparatuses and broadcast services capable of providing new content through a web by being connected to the web is conducted.

Detection of capability (e.g. screen size, display resolution and color depth) of a device on which a web application is executed has long been a problem. While some attempts have been made, such attempts aimed at content adaptation for achieving device independence of content.

As various signal processing devices have been developed and functions of signal processing devices are diversified, necessity for use of various input devices in a signal processing device increases. Accordingly, there is a need for technology of allowing a signal processing device on which the web application is executed to recognize various input devices and to receive various commands.

DISCLOSURE

Technical Problem

An object of the present invention devised to solve the problem lies in a signal processing device and a control method for recognizing various input devices and performing processing to use the input devices.

Another object of the present invention is to provide a signal processing device and a control method for detecting an available input device.

Another object of the present invention is to provide a signal processing device and a control method for discovering characteristics and properties of each input device to be permitted to use an application to be applied according to UI.

Technical Solution

According to one aspect of the present invention, a signal processing device includes: an input unit for receiving a signal from an external input device or detecting a connection state; a storage unit for storing information on the external input device; and a controller for recognizing and activating the external input device on the basis of the signal received from the external input device and the stored information.

The controller may generate an event according to change of a connection state of the external input device.

The external input device may include at least one of a pointer, a keyboard and a remote controller.

The storage unit may include at least one of type, selection button, function button, wheel and gesture properties when the external input device is a pointer.

The type property may include at least one of a mouse, a trackball, a wand and a touchpad.

The selection button property may include at least one of left, middle-left, middle, middle-right and right buttons.

The information on the external input device may include all properties of previous versions and further include new properties.

According to one aspect of the present invention, a method for controlling a signal processing device includes: receiving a signal from an external input device or detecting a connection state; and recognizing and activating the external input device on the basis of stored information on the external input device and the signal received from the external input device.

The receiving of the signal from the external input device may include generating an event according to change of a connection state of the external input device.

The external input device may include at least one of a pointer, a keyboard and a remote controller.

The information on the external input device may include at least one of type, selection button, function button, wheel and gesture properties when the external input device is a pointer.

The type property may include at least one of a mouse, a trackball, a wand and a touchpad.

The selection button property may include at least one of left, middle-left, middle, middle-right and right buttons.

The information on the external input device may include all properties of previous versions and further include new properties.

Advantageous Effects

According to embodiments of the present invention, the signal processing device and the control method can provide different user interfaces on the basis of which types of input devices are available, and what their capabilities are.

In addition, the signal processing device and the control method can perform dynamic content adaptation for a web application.

Furthermore, the signal processing device and the control method can provide a means necessary for web content adaptation.

DESCRIPTION OF DRAWINGS

FIG. 3 is a diagram illustrating DOM 3 event property setting values according to one embodiment of the present invention.

FIG. 4 is a diagram illustrating input device aspects according to various embodiments of the present invention.

FIG. 5 is a diagram illustrating properties of a pointer according to one embodiment of the present invention.

FIG. 6 is a diagram illustrating a type value from among the pointer properties according to one embodiment of the present invention.

FIG. 7 is a diagram illustrating a selection button value from among the pointer properties according to one embodiment of the present invention.

FIG. 8 is a diagram illustrating arrangement of selection buttons from among the pointer properties according to one embodiment of the present invention.

FIG. 9 is a diagram illustrating a selection button value from among the pointer properties according to another embodiment of the present invention.

FIG. 10 is a diagram illustrating arrangement of selection buttons from among the pointer properties according to another embodiment of the present invention.

FIG. 11 is a diagram illustrating a function button value from among the pointer properties according to one embodiment of the present invention.

FIG. 12 is a diagram illustrating a wheel value from among the pointer properties according to one embodiment of the present invention.

FIG. 13 is a diagram illustrating properties of a keyboard according to one embodiment of the present invention.

FIG. 14 is a diagram illustrating a type value from among the keyboard properties according to one embodiment of the present invention.

FIG. 15 is a diagram illustrating a key group value from among the keyboard properties according to one embodiment of the present invention.

FIG. 16 is a diagram illustrating a modification value from among the keyboard properties according to one embodiment of the present invention.

FIG. 17 is a diagram illustrating voice recognition properties according to one embodiment of the present invention.

FIG. 18 is a diagram illustrating properties of a remote controller according to one embodiment of the present invention.

FIG. 19 is a diagram illustrating a type value from among the remote controller properties according to one embodiment of the present invention.

FIG. 20 is a diagram illustrating a button group value from among the remote controller properties according to one embodiment of the present invention.

FIG. 22 is a diagram illustrating code for a pointer device according to one embodiment of the present invention.

FIG. 23 is a diagram illustrating code for detecting and handling input device change according to one embodiment of the present invention.

FIG. 24 is a diagram illustrating a vocabulary reference chart according to one embodiment of the present invention.

BEST MODE

Figure 1:
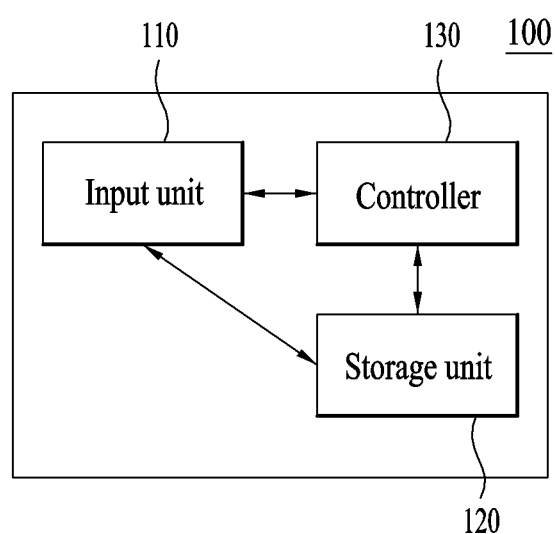
FIG. 1 is a block diagram of a signal processing device according to one embodiment of the present invention.

Hereinafter, exemplary embodiments of the present invention capable of realizing the above-described objects will be described with reference to the accompanying drawings. The configuration and operation of the present invention shown in the drawings and described hereinafter will be described in at least one embodiment, without limiting the spirit and scope of the present invention.

Although the terms used in the present invention are selected from generally known and used terms, terms used herein may vary depending on operator's intention or customs in the art, appearance of new technology, or the like.

In addition, some of the terms mentioned in the description of the present invention have been selected by the applicant at his or her discretion, the detailed meanings of which are described in relevant parts of the description herein. Furthermore, it is required that the present invention be understood, not simply by the actual terms used but by the meanings of each term lying within.

FIG. 1 is a block diagram of a signal processing device according to one embodiment of the present invention.

Referring to FIG. 1, a signal processing device 100 may include an input unit 110, a storage unit 120 and a controller 130.

The input unit 110 receives a signal from an external input device or senses a connection state. The external input device refers to a device which is a device separate from the signal transmission device and can be used as an input means through which commands are input to the signal processing device. For example, the external input device can include a pointer, a keyboard, a microphone, a remote controller and the like. The pointer can include a mouse, a trackball, a wand, a touchpad and the like, and the keyboard can include a general keyboard, a dome key, a soft key and the like. The microphone can be used as a voice recognition means in a signal processing device having a voice recognition function. The remote controller can be used to input commands to the signal processing device using a communication protocol such as infrared, Bluetooth or Wi-Fi.

The storage unit 120 stores information about the external input device. For example, the storage unit 120 can include a device description repository (DDR). The DDR may store information about various external input devices supported by the signal processing device. The storage unit 120 may provide the information about the external input device to a predetermined API when requested to provide the information.

The controller 130 recognizes and activates the external input device on the basis of a signal input from the external input device and the stored information. In addition, the controller 130 may generate an event according to change of connection state of the external input device. For example, when the external input device is connected to the signal processing device or disconnected therefrom, the controller 130 can generate an event. The event may include a corresponding attribute. In one embodiment, the event can include an attribute of an added value when a new external input device is connected to the signal processing device and include an attribute of a removed value when a connected external input device is disconnected from the signal processing device.

The controller 130 may provide an instance of a corresponding aspect on the basis of the information about the external input device, stored in the storage unit 120, according to the connected external input device. In one embodiment, the aspect can be classified into a pointer, a keyboard, voice recognition and a remote controller. The controller 130 may recognize and activate the external input device using property information (e.g. type, value and the like) included in the aspect.

Figure 2:
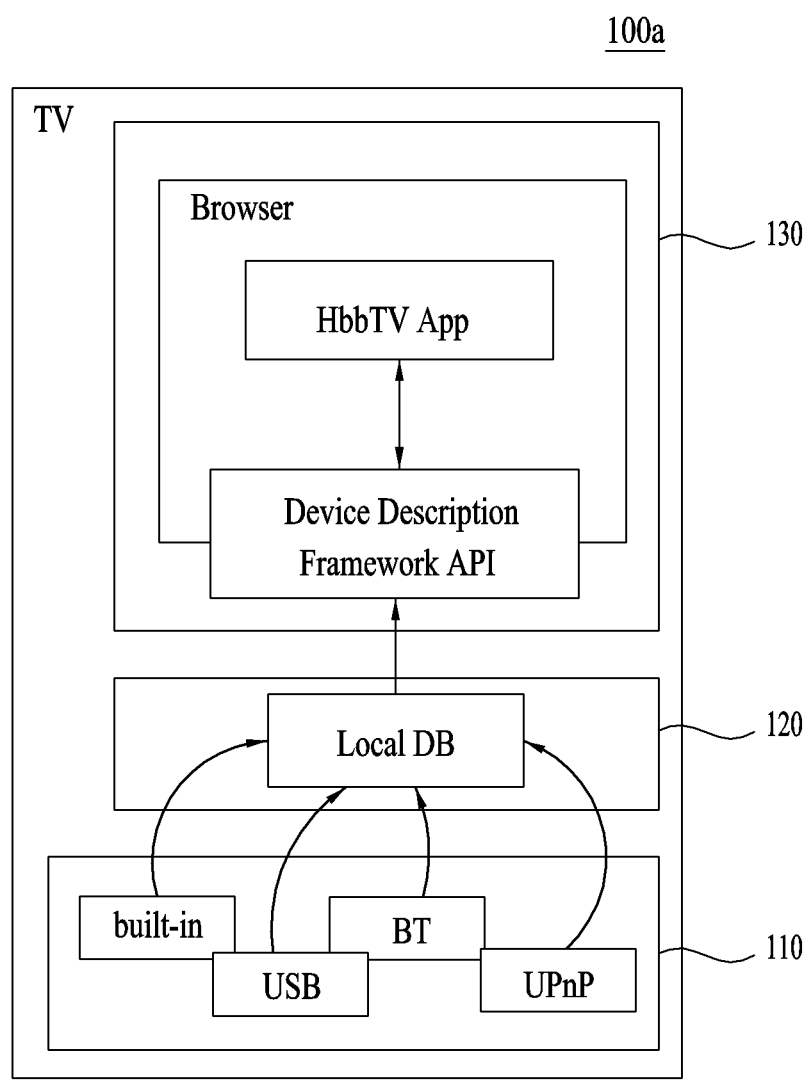
FIG. 2 is a block diagram of a signal processing device according to another embodiment of the present invention.

FIG. 2 is a block diagram of a signal processing device according to another embodiment of the present invention.

Referring to FIG. 2, a signal processing device 100a may include an input unit 110, a storage unit 120 and a controller 130.

For example, the signal processing device 100a can include a TV, a laptop computer, a desktop computer, a monitor, a smartphone, a tablet PC, a navigator, a PMP and the like. The input unit 110 may include an input means embedded in the signal processing device 100a, a USB input means, a broadcast transmission signal input means, a UPnP input means and the like. The storage unit 120 may include a local database. For example, the local database can be implemented as a DDR. The controller 130 may include a browser module. The browser module may include an HbbTV application. The HbbTV application of the browser module may perform communication with a device description framework API through query.

For easy integration with web server infrastructure components like Java and PHP, a DDR API may be implemented as a JavaScript API. Accordingly, a user can easily integrate the web server infrastructure components into an HbbTV client environment. As shown in FIG. 2, the DDR API can be implemented in JavaScript, can also be implemented on an HbbTV client and can be exposed to HbbTV applications. Conceptually, HbbTV applications perform dynamic content adaptation in that the HbbTV applications may wish to provide different user interfaces based on which types of input devices (mouse, keyboard, etc.) are available, and what their capabilities are. Since the DDR API was specifically designed for the needs of dynamic web content adaptation, the DDR API can provide adequate means for UI adaptation in HbbTV applications.

In other words, for easy integration with Web server infrastructure components like Java and PHP, the DDR API was designed as a JavaScript API. This allows us to also easily integrate it into an HbbTV client environment. As shown in FIG. 2, and as it is implemented in JavaScript, the DDR API can also be implemented on an HbbTV client and exposed to HbbTV applications. Conceptually HbbTV applications also perform dynamic content adaptation in that they may wish to provide different user interfaces based on which types of input devices (mouse, keyboard, etc.) are available, and what their capabilities are. Since the DDR API was specifically designed for the needs of dynamic Web content adaptation, it provides adequate mans for UI adaptation in HbbTV applications, too.

The present invention may use a mechanism of the DDR API to define a profile of the API for read-only use in the signal processing device 100a, to define a standardized repository plug-in that provides information from a local database or to define vocabulary for describing characteristics of input devices for the signal processing device 100a. The DDR API mechanism may allow HbbTV applications to query for the presence of input devices, and capabilities and features of the input devices. As new input devices with new capabilities are expected to appear in the future, the user can define riles for evolving the vocabulary in a backwards compatible way to accommodate such new input devices, and still enable legacy applications to function.

In other words, we will use these mechanisms of the Device Description Repository Simple API to define a profile of the API for read-only use on TV devices, to define a standardized repository plug-in that provides information from a local database, to define our own vocabulary for describing the characteristics of input devices for HbbTV devices. This allows HbbTV applications to query for the presence of input devices, and for their capabilities and features. As new input devices with new capabilities are expected to appear in the future, we will also define riles for evolving the vocabulary in a backwards compatible way to accommodate such new input devices, and still enable legacy apps to function.

In description of the DDR API, the DDR API can be defined based on Java. Supported interfaces may be defined in various data types used in the DDR API.

FIG. 3 is a diagram illustrating DOM 3 event property setting values according to one embodiment.

Implementation of the signal processing device provides a conformant implementation of the DDR API with additional restrictions. In other words, TV device implementations shall provide a conformant implementation of the Device Description Repository Simple API with the additional restrictions.

Java representation of the DDR API can define a factory for an initialization service supporting default namespace and settings. The signal processing device may provide a service object representing a local, read-only device database when the newService( ) method is invoked with the class parameter set to org.hbbtv.InputDeviceService. The signal processing devices may optionally provide additional repository interfaces. If a requested repository interface is not available, the signal processing device may respond by throwing an appropriate exception. HbbTV applications may obtain a service object by invoking the newService( ) method with the class parameter set to org.hbbtv.InputDeviceService.

The default vocabulary parameter to the newService( ) method may be used to indicate the vocabulary version. The default vocabulary parameter needs to be constructed according to the following naming convention:

urn:hbbtv-org:Input-Device-Vocabulary:year[-revision]

Year is a four-digit indication of the year in which the vocabulary definition was released, and revision is an optional two-digit indication of the revision within the year in case more than one has been released within the same year. For example, the first revision of the year 2013 can be labeled as urn:hbbtv-org:Input-Device-Vocabulary:2013-01.

When an application requests a vocabulary version equal to or older than the version supported by the signal processing device, the newService( ) method may return a valid service object. When an application requests a newer version of the vocabulary than the one supported by the TV, the newService( ) method may throw an appropriate exception.

In other words, TV devices shall provide a service object representing a local, read-only device database according to the present document when the newService( ) method is invoked with the class parameter set to org.hbbtv.InputDeviceService. TV devices may optionally provide additional repository interfaces. If a requested repository interface is not available, the TV device shall respond by throwing an appropriate exception. HbbTV applications shall obtain a service object by invoking the newService( ) method with the class parameter set to org.hbbtv.InputDeviceService.

The default Vocabulary parameter to the newService( ) method shall be used to indicate the vocabulary version. It shall be constructed according to the following naming convention:

urn:hbbtv-org:Input-Device-Vocabulary:year[-revision]

Where year is a four-digit indication of the year in which the vocabulary definition was released, and revision is an optional two-digit indication of the revision within the year in case more than one have been released within the same year. The first revision of the year 2013 would hence be labeled as urn:hbbtv-org:Input-Device-Vocabulary:2013-01.

If an application requests a vocabulary version equal to, or older than the version supported by the TV, the newService( ) method shall return a valid service object. If an application requests a newer version of the vocabulary than the one supported by the TV, the newService( ) method shall throw an appropriate exception.

In property value query, evidence is a general term applied to providing information to the DDR to determine a delivery context. The delivery context may describe various properties which affect restrictions on use of content. For example, the delivery context can include resolution, an input method, and memory or CPU constraints. Looking at various implementations like WURFL and OpenDDR, evidence may be suggested as a delivery context corresponding to a web surfing device (e.g. a specific mobile phone model). Evidence may set the context in which HTML content is delivered and rendered.

To keep the code in HbbTV applications, which are generic and platform independent, only a single piece of evidence, which refers a local TV device, may be used. The following methods may be used for initializing evidence instances.

```
Evidence newHTTPEvidence( )
Evidence newHTTPEvidence(java.util.Map<String,String>map)
```

Both methods may return fully initialized and ready to use evidence which refers to a local database describing input devices available to the signal processing device. Any parameters passed to the implementation in the second method may be silently ignored.

In other words, "Evidence is the general term applied to providing information to the DDR to allow it to determine the Delivery Context". Looking at various implementations like WURFL and OpenDDR, it must be inferred that an Evidence as a delivery context corresponds to a Web surfing device like e.g. a specific mobile phone model. Hence it sets the context in which the HTML content is delivered and rendered. To keep the code in HbbTV applications generic and platform independent, the present invention uses only a single evidence, which refers to the local TV device. The following methods may be used for initializing evidence instances:

```
Evidence newHTTPEvidence( )
Evidence newHTTPEvidence(java.util.Map<String,String>map)
```

Both methods shall return a fully initialized and ready to use Evidence, that refers to the local database describing the input devices available to the TV device. Any parameters passed to the implementation in the second method shall be silently ignored.

Since the vocabulary defined in the present invention has several aspects which describe fundamentally different input devices, implementations of the present invention will not provide a default aspect. Hence, all method invocations that do either not specify an aspect or specify the null aspect will fail and throw an appropriate exception.

In other words, since the vocabulary defined in the present document has several Aspects which describe fundamentally different input devices, implementations of the present document shall not provide a default Aspect. Hence, all method invocations that do either not specify an Aspect, or specify the Null Aspect shall fail and shall throw an appropriate exception.

Since the original design of the DDR API was intended for exposing general and static information about devices, no means exist in the design to signal dynamic changes in these device descriptions. When describing input devices available to the signal processing device, dynamic changes will however exist. A USB device may be plugged and unplugged at any time and a wireless device may connect and disconnect at any time as the devices are switched on and off or batteries thereof are charged and discharged.

As such changes happen asynchronously, a DOM 3 event according to Table I may be generated when any change to the input device database occurs.

In other words, since the original design of the DDR API was intended for exposing general, static information about devices, no means exist in it to signal any dynamic changes in these device descriptions. When describing the input devices available to a TV device, dynamics will however exist. A USB device may be plugged and unplugged at any time, and wireless devices may connect and disconnect at any time as they get switched on and off, or as their batteries get charged and discharged. As such changes happen asynchronously, a DOM 3 event according to Table I shall be fired when any change to the input device database occurs.

TABLE 1

```
enum HbbtvInputDeviceChange { "added", "removed",
    "updated" };interface
    HbbtvInputDeviceChanged : CustomEvent{ readonly attribute
    HbbtvInputDeviceChange reason;};
```

DOM 3 event properties may be set according to FIG. 3

The following rule may be applied in order to generate an HbbTVInputDeviceChange event.

1) When a new input device becomes available, the reason attribute can be set to "added".

2) When availability of an input device is suspended, the reason attribute can be set to "removed".

3) When an input device becomes available or availability thereof is suspended, the reason attribute can be set to "updated" in order to extend the function of another device (e.g. a separate device, a numeric keypad or a complementing text keyboard) while another device is available.

In one embodiment, when a keyboard, a separate device and a numeric keypad are connected to HbbTV via a USB and either the keyboard or keypad is disconnected, an "updated" event can be generated since some keyboard devices are still available. When a Bluetooth mouse is disconnected due to lack of battery power, a "removed" event can be generated.

When an HbbTVInputDeviceChanged event is handled by an application, properties of a currently used input device may be queried again.

FIG. 4 is a diagram illustrating an input device aspect according to one embodiment.

The DDR API may define vocabulary as follows: the vocabulary is a set of associated properties and aspects. Additionally, the vocabulary is identified by IRI and provides property names and aspect names which constitute the vocabulary. The IRI which identifies the vocabulary can also identify the name space thereof. Property and aspect names need to conform to a grammar unique and defined in the name spaces thereof. Implementation of the present invention may use the name space of urn:hbbtv-org:Input-Device-Vocabulary:2013.

The DDR API can define aspects as follows: an aspect of a delivery context typically refers to hardware or a software category engaged in delivery of web experience. The present invention can make each external input device an aspect.

Referring to FIG. 4, aspects are defined as follows.

Pointer—Allows movement of a pointing indicator across the screen, and allows performance of trigger-type actions associated with screen locations. Example: a computer mouse with one or more buttons.

Keyboard—Allows entering text, and other character sequences. Example: 101-key computer keyboard.

TV remote controller—Allows triggering functions that are typically used to control a TV set. Example: digit keys for selecting services, or color buttons.

These aspects are available under the name space. In one embodiment, the pointer aspect may be available under the accomplished name of urn:hbbtv-org:Input-Device-Vocabulary:2013:Pointer. The signal processing device may expose instances of the aspect defined in FIG. 4, which appropriately describes available input devices. When the device is a special input device (e.g. pointer), the signal processing device can provide instances of the corresponding aspect. When the device is not a special device, the corresponding aspect can be omitted.

FIG. 5 is a diagram illustrating pointer properties according to one embodiment.

The aforementioned aspects may be described as properties, as illustrated in FIG. 5. Referring to FIG. 5, properties are defined as follows.

Pointer:Type—overall type of the device (e.g. mouse, trackball, wand or touchpad), and string type.

Pointer:Select buttons—a microswitch which can be pressed ("clicked") to select or interact with an element of a GUI, and string [ ] type.

Pointer:Funtional buttons—a microswitch which can be pressed ("clicked") to effect special functions of the device, and string [ ] type.

Pointer:Wheel—a small disc or ring ("wheel") that is used for scrolling or panning of content that is larger than the screen, and string [ ] type.

Pointer:Gestures—combinations of pointing device movements and clicks, recognized by software as specific commands, and string [ ] type.

FIG. 6 is a diagram illustrating values of the type from among the pointer properties according to one embodiment.

This property can return one of the values shown in FIG. 6. All pointing devices can provide this property. Referring to FIG. 6, the property is defined as follows.

Mouse—a pointing device that functions by detecting two-dimensional motion relative to its supporting surface.

Trackball—a device where the user rolls the ball with the thumb, fingers, or the palm of the hand to move a pointer.

Wand—a pointing device that functions by detecting three-dimensional motion relative to the force of gravity.

Touchpad—a pointing device featuring a tactile sensor, a specialized surface that can translate the motion and position of user's fingers to a relative position on screen.

When a pointing device is not included in the category of FIG. 6, the pointing device can be reported as a mouse.

FIG. 7 is a diagram illustrating values of the select buttons from among the pointer properties according to one embodiment.

This property can return a value defined in FIG. 7, which is combined using a bitwise mask for identifying a combination set of selection buttons. All pointing devices can have one or more buttons providing this property. Referring to FIG. 7, the property is defined as follows.

Left—the leftmost selection button and has a value of 0x01.

Middle-left—the second leftmost selection button and has a value of 0x02.

Middle—the middle selection button and has a value of 0x04.

Middle-right—the second rightmost selection button and has a value of 0x08.

Right—the rightmost selection button and has a value of 0x10.

"Left" and "right" are used for setting for right-handers. Accordingly, "left" can be interpreted as "closest to the index finger" and "right" can be interpreted as "farthest from the index finger" in order to support input devices for left-handers or input devices for ambidextrous persons.

FIG. 8 is a diagram illustrating arrangement of the selection buttons from among the pointer properties according to one embodiment.

Combinations defined in FIG. 8 may be used to represent selection buttons operated by an index finger, a middle finger, a ring finger and a little finger. Referring to FIG. 8, the property is defined as follows.

Left—one selection button and has a value of 0x01.

Left/right—two selection buttons and has a value of 0x03.

Left/middle/right—three selection buttons and has a value of 0x07.

Left/middle-left/middle-right/right—four selection buttons and has a value of 0x0F.

Left/middle-left/middle/middle-right/right—five selection buttons and has a value of 0x1F.

Each property can return a value defined in FIG. 9.

FIG. 9 is a diagram illustrating values of the select buttons from among the pointer properties according to another embodiment.

All pointing devices having at least one selection button can provide this property. Referring to FIG. 9, the property is defined as follows.

Left—the leftmost selection button.

Middle-left—the second leftmost selection button.

Middle—the middle selection button.

Middle-right—The second rightmost selection button.

Right—The rightmost selection button.

"Left" and "right" are used for setting for right-handers. Accordingly, "left" can be interpreted as "closest to the index finger" and "right" can be interpreted as "farthest from the index finger" in order to support input devices for left-handers or input devices for ambidextrous persons.

FIG. 10 is a diagram illustrating arrangement of the selection buttons from among the pointer properties according to another embodiment.

Combinations defined in FIG. 10 may be used to represent selection buttons operated by an index finger, a middle finger, a ring finger and a little finger. Referring to FIG. 8, the property is defined as follows.

Left—one selection button.

Left/right—two selection buttons.

Left/middle/right—three selection buttons.

Left/middle-left/middle-right/right—four selection buttons.

Left/middle-left/middle/middle-right/right—five selection buttons.

When an additional selection button or a selection button having a special feature (e.g. a thumb button or a click wheel) is present, an additional string may be returned. The additional string may be added to FIG. 10. In one embodiment, when a pointing device has left, right and thumb selection buttons, the property can have [left, right, thumb] value.

FIG. 11 is a diagram illustrating values of the function buttons from among the pointer properties.

A pointing device may have special function buttons for controlling aspects of the signal processing device, which are not related to the GUI. When such function buttons are present, the property may return one or more values defined in FIG. 11. Referring to FIG. 11, the property is defined as follows.

Power—a power button to change a TV state between various power states (e.g. on, standby, etc.).

Home—a button to go directly to the starting point of the TV GUI.

Back—a button to go back to the previously displayed part of the GUI.

Navigation—up, down, left and right arrow keys for navigating the GUI.

Volume—up and down buttons to control the audio volume.

Channel—up and down buttons to switch to the next and previous channels respectively.

Mute—a button to toggle between muted and unmuted audio states.

If the pointing device has a special button used as a selection button such as an OK button for accomplishing a navigation direction, the special button can be described in the pointer:selection button property shown in FIG. 7.

FIG. 12 is a diagram illustrating values of the wheel from among the pointer properties according to one embodiment.

This property can return a value defined in FIG. 12. All pointing devices having a scroll function can provide this property. If a pointing device has no scroll function, the pointing device may not provide this property. Referring to FIG. 12, the property is defined as follows.

Vertical—a vertical wheel for scrolling up and down.

Horizontal—a horizontal wheel for scrolling left and right.

Omnidirectional—a scroll function for simultaneous scrolling in all directions.

When a pointing device has the horizontal or vertical wheel, a "get" method can return a horizontal or vertical string. When the pointing device has both wheels, the pointing device can return two strings of the array. If the pointing device has the omnidirectional scroll function (e.g. scroll ball), the pointing device can return an omnidirectional string. When the pointing device has a scroll function as a second function that can be used as a selection button (e.g. click-wheel or clickable scroll ball), the scroll function may be described in the pointer:selection button property shown in FIG. 7.

Properties of a pointing device may include the pointer: gesture property. This property may return a list of commands that software can recognize from a combination of motion and click of the pointing device. All pointing devices capable of recognizing gestures can provide this property. When a pointing device has no gesture recognition capability, the pointing device may not provide this property. For example, when a device can recognize a gesture of returning to the previous screen, a gesture of returning to the main page of an application and a gesture of finishing the current action, this property can have a property value of [back, home, exit].

FIG. 13 is a diagram illustrating keyboard properties according to one embodiment.

The keyboard properties may be described as shown in FIG. 13. Referring to FIG. 13, the properties are is defined as follows.

Keyboard:Type—the construction type of the keyboard, and string type.

Keyboard:KeyGroups—groups of keys present on the keyboard, and string type.

Keyboard:Modifiers—available modifier keys, and string type

Keyboard:Language—language and layout of the key legends, and string type.

Keyboard:DoesRepeat—repeating keys when held down, and Boolean type.

FIG. 14 is a diagram illustrating values of type from among the keyboard properties.

A keyboard device may provide this property. Referring to FIG. 14, the property is defined as follows. This property can return a value defined in FIG. 14.

Desktop—desktop PC type keyboard allowing for high typing speeds at low strain.

RubberDome—Dome-switch, or other chiclet type keyboard allowing for reduced typing speeds at high strain.

Software—virtual keyboard displayed on the screen through software. Typically operated using a pointing device, or a TV remote controller with navigation keys.

When this property is present, a property value can be used by application producers to estimate easiness of typing provided by a keyboard. A keyboard design that requires high strain for typing may typically provide low typing speed and increase tension and tiredness of hands/arms. Similarly, a software keyboard increases eyestrain. In this case, application producers may intend to adapt application UIs for reducing the quantity of text input of a user.

FIG. 15 is a diagram illustrating values of the key groups from among the keyboard properties according to one embodiment.

Keyboards in various sizes, forms and modifications are present and designed for various purposes. Keyboards may have various key sets. This property can represent all keyboard aspects to reduce possibility of confusion about available keys and return one or more values defined in FIG. 15. Referring to FIG. 15, the property is defined as follows.

Typewriter—letters, digits, space, punctuation, etc.

Function—F1, F2, etc.

Numeric—separate numeric keypad

Navigation—up, down, left and right arrows, page up, page down, home, end, etc.

Other—ESC, print screen, etc.

Since keyboards can use different labels for the same function, the names of the list shown in FIG. 15 may not be interpreted as specific names or key labels and can be interpreted as the described functions. In addition, the function list may not be limited to the function list of FIG. 15. An executor may apply the function list when classifying keys and functions provided by a keyboard according to FIG. 15 from a common-sense point of view.

FIG. 16 is a diagram illustrating values of the modifier from among the keyboard properties.

A modifier key is a special key (or combination) of computer keys, which temporarily modifies normal operations of other keys when pressed along with the other keys. The modifier key typically performs no action. When a keyboard has one or more modifier keys, the keyboard aspect can provide this property and return one or more values defined in FIG. 16. When an additional modifier key is present, an additional string can be returned. Referring to FIG. 16, the property is defined as follows.

Shift—used to type the upper of two symbols engraved on a given key, or the upper-case variant in case of letter keys.

ShiftLock—pressing this key sets an input mode in which all typed keys generate the upper of two symbols engraved on a given key, or the upper-case variant in case of letter keys by default. The keyboard remains in shift lock mode until the key is pressed again.

CapLock—pressing this key sets an input mode in which all typed letters are uppercase by default. Non-letter keys remain unaffected. The keyboard remains in caps lock mode until the key is pressed again.

Ctrl—used to trigger special operations when used in concert with other keys.

Alt—used to trigger special operations when used in concert with other keys.

AltGr—used to trigger special operations when sued in concert with other keys.

Option—used to trigger special operations when used in concert with other keys.

Cmd—used to trigger special operations when used in convert with other keys.

The keyboard properties may include a keyboard;language property. This property can return an IETF language tag defined in BCP 47 describing legends (label, marking, imprinting) indicated on keys of the keyboard. Conventional layout of keys can suggest use of a language. All keyboard aspects can provide this property.

Furthermore, the keyboard properties may include keyboard:DoesRepeat property. Pressing a key for a long time can be recognized as repeated pressing. Here, this property can return a value "true". When pressing a key for a long time is recognized as pressing once, this property can return a value "false".

FIG. 17 is a diagram illustrating voice recognition properties according to one embodiment.

The voice recognition properties may be described as shown in FIG. 17. Referring to FIG. 17, the properties are defined as follows.

VoiceRecognition:CanDoSpeechToText—whether speech-to-text is available, and Boolean type.

VoiceRecognition:SpokenCommands—list of spoken commands that are understood, and string [ ] type.

When the signal processing device provides a pre-text speech recognition (e.g. similar to a dictation system) function, the signal processing device can execute VoiceRecognition:CanDoSpeechToText property and return a value "true". When the signal processing device can recognize only a fixed list of voice commands (e.g. play, strop, channel up, etc.), the signal processing device can execute a VoiceRecognition:SpokenCommands property and return the recognized command list.

FIG. 18 is a diagram illustrating remote controller properties according to one embodiment.

The remote controller properties may be described as shown in FIG. 18. Referring to FIG. 18, the properties are defined as follows.

TVremote:type—overall type of the device (e.g. infrared, Bluetooth, or Wi-Fi), and string type.

TVremote:ButtonGroups—the functional groups of buttons present on the remote controller, and string type.

FIG. 19 is a diagram illustrating values of type from among the remote controller properties according to one embodiment.

TVremote:Type property can return values defined in FIG. 19. When the remote controller aspect is present, this property can be provided. Referring to FIG. 19, the property is defined as follows.

Infrared—unidirectional transmission in the range of 100 µm to 100 nm wavelength and requires line of sight.

Bluetooth—bidirectional, personal area network (PAN) type connection in the 2400 MHz to 2480 MHz IUSM band.

Wi-Fi—bidirectional, local area network (LAN) type connection using the IEEE 802.11 suite of specifications.

FIG. 20 is a diagram illustrating values of button groups from among the remote controller properties according to one embodiment.

TVremote:ButtonGroups property can return values defined in FIG. 20. When the remote controller aspect is present, this property can be provided. Referring to FIG. 20, the property is defined as follows.

Power—power on/off, standby, etc.

Digits—the decimal digits zero through nine, etc.

Zapper—channel up/down, volume up/down, mute, etc.

Function—four color buttons, and other generic buttons.

Navigation—four arrow keys, OK, home, back, etc.

Teletext—teletext, transparent, freeze, reveal information, next/previous subpage, size, etc.

Playback—play, pause, stop, fast forward, fast rewind, next, track, previous track, record, etc.

SiverDisc—eject, open/close, timer mode, etc.

Since TV remote controllers can use different labels for the same function, the names of the list shown in FIG. 20 may not be interpreted as specific names or button labels and can be functionally described. In addition, the function list may not be limited to the function list of FIG. 20. An executor may apply the function list when classifying functions provided by a remote controller according to FIG. 20 from a common-sense point of view.

Figure 21:
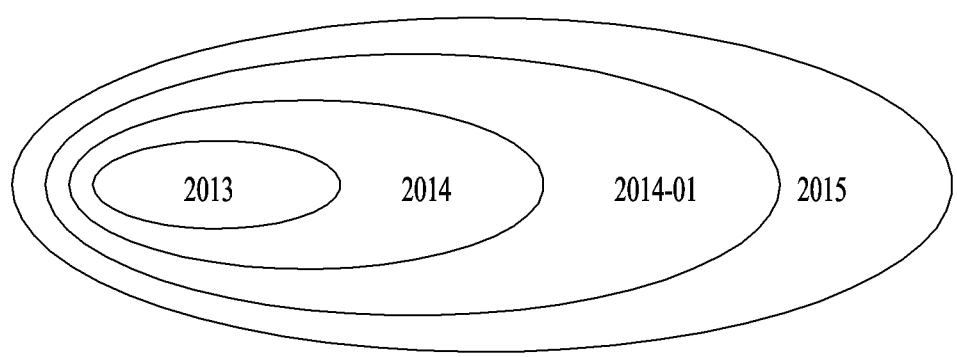
FIG. 21 is a diagram illustrating vocabulary ranges depending on versions according to one embodiment of the present invention.

FIG. 21 is a diagram illustrating vocabulary ranges according to versions according to one embodiment.

A new version of vocabulary can be extended only from the previous version. That is, only a new aspect or a new property can be added. An aspect or a property of the previous version cannot be modified or removed. Accordingly, the newest version is always a superset of all previous versions.

When a new feature is not added in this manner, a new vocabulary version needs to redefine a problematic element as a new name. Accompanying specifications need to clearly state previous elements substituted by new elements and to support transition.

Since vocabulary develops with time, new aspects and properties will be added. A new version of vocabulary can include all elements of the previous version because of a defined evolution rule.

The HbbTV application may be recorded for one special version of vocabulary. In the signal processing apparatus, device description service execution may be recorded for one special version of vocabulary. These versions are not always matched.

The device description service may appropriately provide all versions of vocabulary, including the executed one, to a client because of an extension exclusive rule. Device description service execution may handle all requests for the previous versions of vocabulary.

To ensure maximum portability of the HbbTV application, the application producer may not use the new version of vocabulary rather than providing all necessary features of the application.

In one embodiment, it is assumed that the current vocabulary version in which the vocabulary name space is defined as urn:hbbtv-org:Input-Device-Vocabulary:2013 in the same year as the HbbTV application produced in 2013 is distributed. When the HbbTV application requires only supporting of a default input device which was introduced with the vocabulary name space of urn:hbbtv-org:Input-Device-Vocabulary:2011 the application producer can use the 2011 version of the name space.

If the producer uses the 2013 version of the name space, the application will fail to operate in TVs introduced in 2011 and 2012 even if the device requires an input device function. When an older 2011 name space is designated, newly developed applications will operate in all TV devices.

Since a read-only, local database is used, there is no special consideration for remote resources. Only general security consideration is needed, which is applied to all local JavaScript APIs like buffer overflow, random data and similar vulnerability. Accordingly, there is no need for additional security beyond the general security provided by JavaScript.

FIG. 22 is a diagram illustrating code for a pointer device according to one embodiment.

Referring to FIG. 22, the sample JavaScript shows initialization of a local HbbTV input device service, a query method for the pointing device and which buttons are included in the pointing device.

FIG. 23 is a diagram illustrating code that detects and handles input device change according to one embodiment.

Referring to FIG. 23, the sample JavaScript shows a method for detecting change of input device presence and handling the change using the aforementioned DOM event.

FIG. 24 is a diagram illustrating a vocabulary reference chart according to one embodiment of the present invention.

Referring to FIG. 24, the signal processing device may use the name space of urn:hbbtv-org:Input-Device-Vocabulary:2013. The signal processing device may include pointer, keyboard, voice recognition, remote controller aspects and various properties according to each aspect. Details have been described and thus are omitted.

Figure 25:
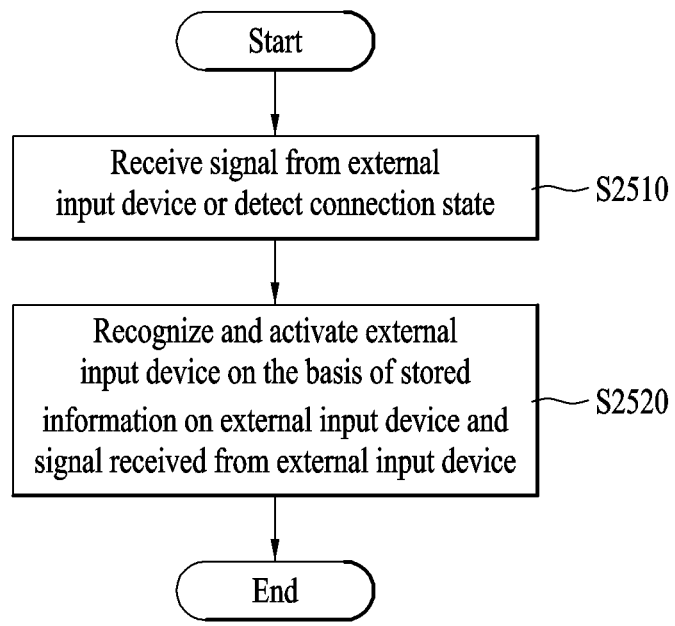
FIG. 25 is a flowchart illustrating a method for controlling the signal processing device according to one embodiment of the present invention.

FIG. 25 is a flowchart illustrating a method for controlling the signal processing device according to one embodiment of the present invention.

Referring to FIG. 25, the signal processing device receives a signal from an external input device or detects a connection state (S2510). The signal processing device may generate an event according to change of the connection state of the external input device. An attribute value is transferred to the controller using a DDR API according to the generated event and the controller may perform necessary processing.

The signal processing device recognizes and activates the external input device on the basis of information about the external input device, stored therein, and the signal received from the external input device (S2520). When a new external input device is connected, the signal processing device may recognize the aspect and properties of the corresponding external input device.

For example, the aspect of the external input device can include a pointer, a keyboard or a remote controller. Each aspect may include a necessary attribute. When the external input device is a pointer, properties thereof may include type, selection buttons, function buttons, wheel and gesture properties. The type property may include a mouse, a trackball, a wand and a touchpad, and the selection button property may include left, middle-left, middle, middle-right and right buttons.

Information about an external input device includes all properties of the previous version and further includes new properties and thus the external input device can maintain compatibility with the previous device.

The signal processing device and the control method according to the present invention are not limited to the configurations and methods of the above-described embodiments and all or some of the embodiments may be selectively combined to obtain various modifications.

The method for controlling the signal processing device according to the present invention may be implemented as software in a processor-readable recording medium included in the signal processing device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

MODE FOR INVENTION

Industrial Applicability

The present invention is applicable to signal processing and has reproducible industrial applicability.

The invention claimed is:

1. A signal processing device, comprising:
an input transceiver configured to receive a signal from an external input device;
a storage configured to store information on the external input device; and
a controller configured to recognize and activate the external input device on the basis of the received signal from the external input device and the information on the external input device,
wherein the information on the external input device includes selection information and function information for the external input device,
wherein the selection information includes information indicating a left movement or right movement, and
wherein the function information includes information indicating going back to a previous display.

2. The signal processing device according to claim 1, wherein the controller generates an event according to a change of a connection state of the external input device.

3. The signal processing device according to claim 1, wherein the external input device includes at least one of a pointer, a keyboard and a remote controller.

4. The signal processing device according to claim 3, wherein the storage unit includes at least one of type, wheel, and gesture properties when the external input device is a pointer.

5. The signal processing device according to claim 4, wherein the type property includes at least one of a mouse, a trackball, a wand and a touchpad.

6. The signal processing device according to claim 1, wherein the selection information further includes at least one of left, middle-left, middle, middle-right and right buttons.

7. The signal processing device according to claim 1, wherein the information on the external input device includes all properties of previous versions and further includes new properties.

8. A method for controlling a signal processing device, the method comprising:
receiving a signal from an external input device; and recognizing and activating the external input device on the basis of the signal from the external input device and information on the external input device, wherein the information on the external input device includes selection information and function information for the external input device, wherein the selection information includes information indicating a left movement or right movement, and wherein the function information includes information indicating going back to a previous display.

9. The method according to claim 8, wherein the receiving of the signal from the external input device comprises generating an event according to a change of a connection state of the external input device.

10. The method according to claim 8, wherein the external input device includes at least one of a pointer, a keyboard and a remote controller.

11. The method according to claim 10, wherein the information on the external input device includes at least one of type, wheel, and gesture properties when the external input device is a pointer.

12. The method according to claim 11, wherein the type property includes at least one of a mouse, a trackball, a wand and a touchpad.

13. The method according to claim 8, wherein the selection information further includes at least one of left, middle-left, middle, middle-right and right buttons.

14. The method according to claim 8, wherein the information on the external input device includes all properties of previous versions and further includes new properties.

* * * * *